(12) United States Patent
Hinami et al.

(10) Patent No.: US 9,884,405 B2
(45) Date of Patent: Feb. 6, 2018

(54) WATER JET PEENING DEVICE

(71) Applicant: MITSUBISHI HEAVY INDUSTRIES, LTD., Tokyo (JP)

(72) Inventors: Kazuyuki Hinami, Tokyo (JP); Kenichi Kawanishi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/758,639

(22) PCT Filed: Jan. 9, 2014

(86) PCT No.: PCT/JP2014/050260
§ 371 (c)(1),
(2) Date: Jun. 30, 2015

(87) PCT Pub. No.: WO2014/132678
PCT Pub. Date: Sep. 4, 2014

(65) Prior Publication Data
US 2015/0340108 A1 Nov. 26, 2015

(30) Foreign Application Priority Data

Feb. 27, 2013 (JP) ................................. 2013-037607

(51) Int. Cl.
*B24C 1/10* (2006.01)
*B24C 7/00* (2006.01)
(Continued)

(52) U.S. Cl.
CPC .............. *B24C 1/10* (2013.01); *B24C 7/0007* (2013.01); *B24C 7/0084* (2013.01);
(Continued)

(58) Field of Classification Search
CPC ...... G21C 19/00; G21C 19/105; G21C 19/14; G21C 19/16; G21C 17/017
(Continued)

(56) References Cited

U.S. PATENT DOCUMENTS 3,728,891 A * 4/1973 Hall, Jr. ................... B21D 1/06
72/465.1
4,112,535 A * 9/1978 Wild ..................... E04G 23/002
134/172
(Continued)

FOREIGN PATENT DOCUMENTS

| JP | 53-32085 A | 3/1978 |
|---|---|---|
| JP | 6-114735 A | 4/1994 |

(Continued)

OTHER PUBLICATIONS

Translation of Written Opinion dated Mar. 25, 2014 issued in counterpart application No. PCT/JP2014/050260 (4 pages).
(Continued)

*Primary Examiner* — R. K. Arundale
*Assistant Examiner* — Joseph Finan, Jr.
(74) *Attorney, Agent, or Firm* — Westerman, Hattori, Daniels & Adrian, LLP

(57) ABSTRACT

According to the present invention, the distance between a spray nozzle and a surface to be constructed is kept constant, and the spray nozzle is moved smoothly to perform water jet peening in a suitable state of construction. A water jet peening device has a spray nozzle (8) for spraying a water jet, the spray nozzle being capable of moving along a predetermined movement trajectory so that a spray port (8a) of the spray nozzle points upward or downward.

4 Claims, 12 Drawing Sheets

(51) Int. Cl.
   G05B 19/404    (2006.01)
   G21C 17/01     (2006.01)
   G21C 19/20     (2006.01)
   G21C 19/28     (2006.01)

(52) U.S. Cl.
   CPC .......... *G05B 19/404* (2013.01); *G21C 17/01* (2013.01); *G21C 19/20* (2013.01); *G21C 19/207* (2013.01); *G21C 19/28* (2013.01)

(58) Field of Classification Search
   USPC .............................................. 72/37
   See application file for complete search history.

(56) References Cited

U.S. PATENT DOCUMENTS

| | | | | |
|---|---|---|---|---|
| 4,311,556 A * | 1/1982 | Iwamoto | ............... | G21C 17/01 376/249 |
| 4,316,628 A * | 2/1982 | Farmer | ............... | B25B 11/007 294/189 |
| 4,330,865 A * | 5/1982 | Hyde | ............... | G21C 17/013 180/8.5 |
| 5,305,361 A * | 4/1994 | Enomoto | ............. | B05B 15/061 134/1 |
| 5,418,824 A * | 5/1995 | Monserud | .............. | B08B 9/023 134/167 C |
| 5,778,713 A | 7/1998 | Butler et al. | | |
| 5,782,255 A * | 7/1998 | Magnin | .................... | F28G 3/16 122/392 |
| 5,838,752 A * | 11/1998 | Shimamura | ........... | G21C 17/01 348/83 |
| 6,425,276 B1 * | 7/2002 | Hirano | ..................... | B24C 1/10 134/10 |
| 6,555,779 B1 * | 4/2003 | Obana | .................. | B23K 9/0061 219/121.63 |
| 7,303,360 B2 * | 12/2007 | Nakagawa | ............. | B63C 11/42 114/222 |
| 2011/0198075 A1 * | 8/2011 | Okada | .................. | G21C 17/017 166/170 |
| 2013/0125929 A1 * | 5/2013 | Inada | ................... | G21C 17/017 134/22.12 |

FOREIGN PATENT DOCUMENTS

| | | |
|---|---|---|
| JP | 9-19884 A | 1/1997 |
| JP | 11-30692 A | 2/1999 |
| JP | 2001-264482 A | 9/2001 |
| JP | 2002-200528 A | 7/2002 |
| JP | 2009-226581 A | 10/2009 |
| JP | 2011-185925 A | 9/2011 |

OTHER PUBLICATIONS

International Search Report dated Mar. 25, 2014, issued in corresponding application No. PCT/JP2014/050260 (2 pages).
Written Opinion dated Mar. 25, 2014, issued in corresponding application No. PCT/JP2014/050260 (3 pages).
Office Action dated Dec. 6, 2016, issued in counterpart Japanese Application No. 2013-037607, with English translation (6 pages).
Office Action dated Dec. 6, 2016, issued in counterpart Japanese Application No. 14757284.5, with English translation (6 pages).
Office Action dated Nov. 18, 2016, issued in counterpart European Application No. 14757284.6 (7 pages).

* cited by examiner

WATER JET PEENING DEVICE

TECHNICAL FIELD

The present invention relates to a water jet peening device for repairing an inner surface of a tube support provided in a nuclear power generation plant.

BACKGROUND ART

For example, in a nuclear power generation plant including a Pressurized Water Reactor (PWR), a light water which is a primary cooling water is used as a nuclear reactor coolant and a neutron moderator to generate high-temperature and high-pressure water which is not boiled over the entire reactor core, the high-temperature and high-pressure water is fed to a steam generator to generate steam by heat exchange, the steam is fed to a turbine generator, and thus, electricity is generated.

In the nuclear power generation plant, in order to secure sufficient stability and reliability of the Pressurized Water Reactor, it is necessary to examine various structures or the like periodically. In addition, when the examination is performed and defects are found, necessary locations related to the defects are repaired. For example, in the Pressurized Water Reactor, the reactor vessel body includes an outlet side tube support for supplying the primary cooling water to the steam generator and an inlet side tube support for adsorbing the primary cooling water which is heat-exchanged by the steam generator. A primary cooling water pipe communicating with the steam generator is connected to the tube support by welding. In addition, since a material of the tube support is different from that of the primary cooling water pipe, a safe end pipe is connected between the tube support and the primary cooling water pipe by welding.

Residual tensile stress generated in a welding portion of the tube support and the periphery thereof may cause stress corrosion cracking. Accordingly, in the related art, there is a water jet peening technology for preventing the stress corrosion cracking by improving the residual tensile stress on the surface into residual compressive stress. In this water jet peening, the residual tensile stress on a surface of a metal member is improved into the residual compressive stress by spraying high-pressure water including cavitation air bubbles on the surface of the metal member in water. For example, as the water jet peening device, there is a water jet peening device disclosed in PTL 1 below.

In the water jet peening device disclosed in PTL 1, in order to keep a distance between a spray nozzle and a surface to be constructed so as to be constant, a guide is attached around the spray nozzle, a slight pressing force is applied to the guide by a pressing device, and the guide comes into contact with the surface to be constructed to trace the shape of the surface to be constructed.

CITATION LIST

Patent Literature

[PTL 1] Japanese Unexamined Patent Application Publication No. 6-114735

SUMMARY OF INVENTION

Technical Problem

In the water jet peening device disclosed in PTL 1, water jet peening is performed on a welding portion of an instrumentation tube support penetrating a lower mirror of a reactor vessel body and the periphery thereof in a state where a spray nozzle is directed downward or a direction inclined to the instrumentation tube support. However, in the case of the tube support of the above-described reactor vessel body, the water jet peening is performed on not only the lower portion of the tube support but also the upper portion thereof. Accordingly, in the water jet peening with respect to the upper portion, the spray nozzle is pushed downward by a reaction force and gravity of the water jet, the pressing force of the guide decreases, and thus, the contact between the surface to be constructed and the guide cannot be maintained, that is, there is a concern that the distance between the spray nozzle and the surface to be constructed cannot be kept to be constant. Meanwhile, in the water jet peening with respect to the lower portion, the spray nozzle is pushed downward by the gravity, the pressing force of the guide increases, a load is applied with respect to the tracing of the shape of the surface to be constructed, and there is a concern that the spray nozzle cannot be moved smoothly. As a result, it is not possible to perform the water jet peening in a suitable state of construction.

The present invention is made to solve the above-described problems, and an object thereof is to provide a water jet peening device capable of keeping the distance between the spray nozzle and the surface to be constructed so as to be constant, moving the spray nozzle smoothly, and performing the water jet peening in a suitable state of construction.

Solution to Problem

In order to achieve the object, according to a first aspect of the present invention, there is provided a water jet peening device in which a spray nozzle for spraying water jet is provided so as to be movable along a predetermined movement trajectory so that a spray port of the spray nozzle is directed upward and downward, including: a guide portion which includes a tip portion disposed at a position aligned with a predetermined distance over which the water jet is sprayed from the spray port, and is provided so as to be movable with the spray nozzle along the movement trajectory; a pressing movement mechanism which presses and moves the spray nozzle and the guide portion along a direction in which the water jet is sprayed from the spray port; nozzle position detection means for detecting a movement position of the spray port in the movement trajectory; and control means for controlling a pressing force of the pressing movement mechanism on the guide portion, on the basis of the movement position of the spray port detected by the nozzle position detection means.

According to the water jet peening device, for example, when the direction of the spray port is the movement position including an upward component, the control means controls the pressing movement mechanism so as to increase the pressing force, and increases the pressing force which presses the guide portion upward against the reaction force and the gravity of the water jet. Accordingly, since it is possible to prevent the tip portion of the guide portion from being separated from the surface to be constructed, the spray distance of the water jet between the spray port and the surface to be constructed is maintained, and it is possible to maintain an operation of the water jet peening with respect to the surface to be constructed. Meanwhile, when the direction of the spray port is the movement position including a downward component, the control means controls the pressing movement mechanism, and decreases a pressing force by which the guide portion is pressed downward against the spray nozzle being pushed downward by the gravity. Accordingly, since it is possible to prevent a contact pressure when the tip portion of the guide portion comes into contact with the surface to be constructed from increasing, the spray nozzle can smoothly move along the movement trajectory of the spray nozzle. That is, regardless of the movement position of the spray port, it is possible to keep the contact pressure of the tip portion of the guide portion so as to be constant.

According to a second aspect of the invention, the water jet peening device related to the first aspect may further include: contact detection means for detecting contact of the tip portion of the guide portion.

According to the water jet peening device, since the contact detection means is provided, it is possible to confirm that the tip portion of the guide portion comes into contact with the surface to be constructed, and thus, it is possible to securely maintain a predetermine distance over which the water jet is sprayed from the spray port, and it is possible to improve construction accuracy of the water jet peening.

According to a third aspect of the invention, in the water jet peening device related to the first or the second aspect, the water jet peening device may spray the water jet to an inner surface of a tube support which includes an opening portion on a wall surface and extends to include a horizontal component, and the water jet peening device may further include: a frame which supports the spray nozzle and the guide portion and is provided so as to be inserted into the inner portion of the tube support; an external abutment member which is provided on the frame and abuts the wall surface when the frame is inserted into a predetermined position inside the tube support; internal abutment members which are provided at a plurality of locations around the frame in a portion of the frame inserted into the inner portion of the tube support and is provided so as to be movable forward and rearward in a radial direction centered around the frame; and suction means which is provided on the frame and can be sucked to the wall surface when the frame is inserted into the predetermined position inside the tube support.

According to the water jet peening device, since the external abutment member is provided, it is possible to position the state where the frame is inserted into the predetermined position inside the tube support. In addition, since the internal abutment member is provided, it is possible to align a center position of the frame with a center position of the tube support. Moreover, since the suction means is provided, it is possible to maintain the state where the frame inserted into the inner portion of the tube support is positioned by the external abutment member, and the state where the center position of the frame is aligned with the center position of the tube support by the internal abutment member.

According to a fourth aspect of the invention, the water jet peening device related to the third aspect may further include: abutment detection means for detecting abutment of the external abutment member on the wall surface.

According to the water jet peening device, since the abutment detection means is provided, it is possible to recognize the state where the external abutment member abuts the wall surface, that is, an intent that the frame inserted into the inner portion of the tube support by the external abutment member is positioned.

According to a fifth aspect of the invention, the water jet peening device related to the third or the fourth aspect may further include: photographing means for photographing an insertion tip side of the frame, which is inserted into the tube support, from an insertion rear end side, and the photographing means may be provided on the frame.

According to the water jet peening device, since the photographing means is provided, it is possible to monitor the state of the frame inserted into the tube support.

Advantageous Effects of Invention

According to the present invention, it is possible to keep a distance between a spray nozzle and a surface to be constructed so as to be constant, smoothly move the spray nozzle, and perform water jet peening in a suitable state of construction.

DESCRIPTION OF EMBODIMENTS

Hereinafter, an embodiment of the present invention will be described in detail with reference to the drawings. In addition, the present invention is not limited by the embodiment. Moreover, components in the embodiment below include components replaceable by a person skilled in the art or substantially the same components.

Figure 1:
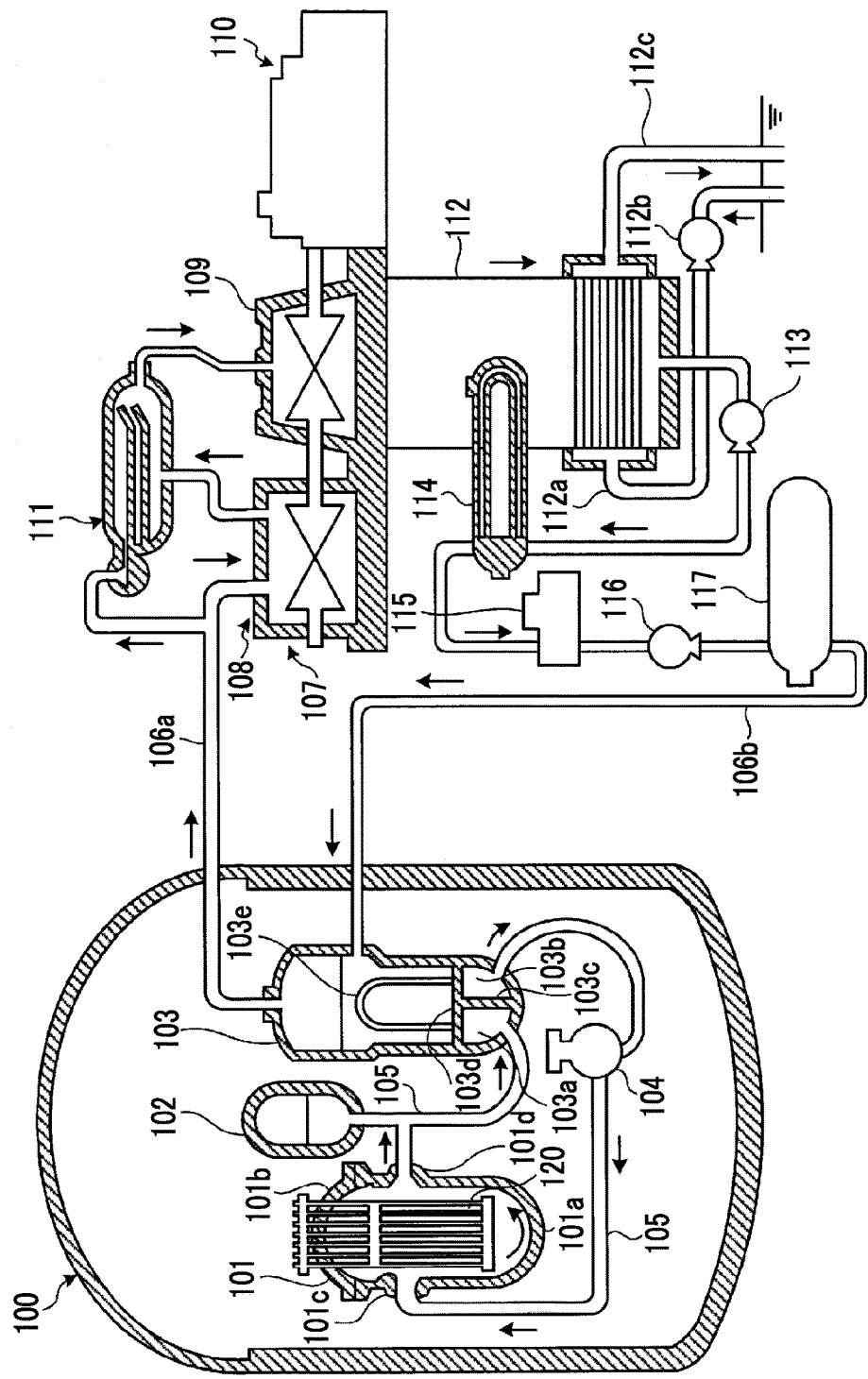
FIG. 1 is a schematic configuration view showing an example of a nuclear power generation plant.

FIG. 1 is a schematic configuration showing an example of a nuclear power generation plant. The nuclear power generation plant shown in FIG. 1 includes a Pressurized Water Reactor (PWR). In the nuclear power generation plant, in a reactor container 100, a reactor vessel 101, a pressurizer 102, a steam generator 103, and a primary cooling water pump 104 of the Pressurized Water Reactor are sequentially connected to one another by a primary cooling water pipe 105, and a circulation path of primary cooling water is configured.

A fuel assembly 120 is stored inside the reactor vessel 101 in a sealed state, and includes a reactor vessel body 101a and a reactor vessel cover 101b which is mounted on the upper portion of the reactor vessel body 101a to insert and extract the fuel assembly 120. An inlet side tube support 101c and an outlet side tube support 101d for supplying and discharging light water which is primary cooling water are provided on the upper portion of the reactor vessel body 101a. A primary cooling water pipe 105 is connected to the outlet side tube support 101d so that the outlet side tube support communicates with an inlet side water chamber 103a of a steam generator 103. In addition, the primary cooling water pipe 105 is connected to the inlet side tube support 101c so that the inlet side tube support communicates with an outlet side water chamber 103b of the steam generator 103.

In the lower portion of the steam generator 103 which is configured in a semispherical shape, the inlet side water chamber 103a and the outlet side water chamber 103b are provided so as to be partitioned by a partition plate 103c. The inlet side water chamber 103a and the outlet side water chamber 103b are partitioned with the upper portion side of the steam generator 103 by a tube plate 103d provided on the ceiling portions of the chambers 103a and 103b. A heat transfer pipe 103e having an inverted U shape is provided on the upper portion side of the steam generator 103. End portions of the heat transfer pipe 103e are supported by the tube plate 103d so that the heat transfer pipe 103e is connected to the inlet side water chamber 103a and the outlet side water chamber 103b. In addition, the inlet side water chamber 103a is connected to the inlet side primary cooling water pipe 105, and the outlet side water chamber 103b is connected to the outlet side primary cooling water pipe 105. Moreover, in the steam generator 103, an outlet side secondary cooling water pipe 106a is connected to the upper end of the upper portion side which is partitioned by the tube plate 103d, and an inlet side secondary cooling water pipe 106b is connected to the side portion of the upper portion side.

In addition, in the nuclear power generation plant, the steam generator 103 is connected to a steam turbine 107 via the secondary cooling water pipes 106a and 106b outside the reactor container 100, and thus, a circulation path of secondary cooling water is configured.

The steam turbine 107 includes a high-pressure turbine 108 and a low-pressure turbine 109, and a generator 110 is connected to the steam turbine 107. Moreover, a moisture separating heater 111 is branched from the secondary cooling water pipe 106a and is connected to the high-pressure turbine 108 and the low-pressure turbine 109. In addition, the low-pressure turbine 109 is connected to a condenser 112. The condenser 112 is connected to the secondary cooling water pipe 106b. As described above, the secondary cooling water pipe 106b is connected to the steam generator 103 and reaches the steam generator 103 from the condenser 112, and a condensate pump 113, a low-pressure water supply heater 114, a deaerator 115, a main water supply pump 116, and a high-pressure water supply heater 117 are provided in the secondary cooling water pipe 106b.

Accordingly, in the nuclear power generation plant, the primary cooling water is heated in the reactor vessel 101 to increase the temperature and the pressure, is pressurized in the pressurizer 102 to maintain the pressure so as to be constant, and is supplied to the steam generator 103 via the primary cooling water pipe 105. In the steam generator 103, heat exchange between the primary cooling water and the secondary cooling water is performed, and thus, the secondary cooling water is evaporated, and steam is generated. The cooled primary cooling water after the heat exchange is recovered to the primary cooling water pump 104 side via the primary cooling water pipe 105, and is returned to the reactor vessel 101. Meanwhile, the secondary cooling water evaporated by the heat exchange is supplied to the steam turbine 107. In the steam turbine 107, the moisture separating heater 111 removes moisture from the exhaust of the high-pressure turbine 108, and after the exhaust is further heated so as to be overheated, the exhaust is fed to the low-pressure turbine 109. The steam turbine 107 is driven by steam of the secondary cooling water, the power is transmitted to the generator 110, and electricity is generated. The steam supplied to the driving of the turbine is discharged to the condenser 112. In the condenser 112, cooling water (for example, sea water) taken by a pump 112b via an intake pipe 112a and the steam discharged from the low-pressure turbine 109 are heat-exchanged, and thus, the steam is condensed so as to be returned to a low-pressure saturated liquid. The cooling water used in the heat exchange is discharged from a drain pipe 112c. In addition, the condensed saturated liquid becomes the secondary cooling water and is discharged to the outside of the condenser 112 via the secondary cooling water pipe 106b by the condensate pump 113. In addition, the secondary cooling water passing through the secondary cooling water pipe 106b is heated by low-pressure steam extracted from the low-pressure turbine 109 in the low-pressure water supply heater 114, and after impurities of the secondary cooling water such as dissolved oxygen or non-condensable gas (ammonia gas) are removed by the deaerator 115, the secondary cooling water is fed by the main water supply pump 116. In addition, for example, after the secondary cooling water is heated by high-pressure steam extracted from the high-pressure turbine 108 using the high-pressure water supply heater 117, the secondary cooling water is returned to the steam generator 103.

In the Pressurized Water Reactor of the nuclear power generation plant configured in this way, as described above, in the reactor vessel 101, the primary cooling water pipe 105 is connected to the inlet side tube support 101c and the outlet side tube support 101d. Moreover, since materials of the inlet side tube support 101c and the outlet side tube support 101d are different from a material of the primary cooling water pipe 105, a safe end pipe 121 is connected to a portion therebetween by welding (groove welding portion 122) (refer to FIGS. 3 and 4).

Accordingly, tensile stress may remain in the groove welding portion 122 and the periphery thereof, and thus, probability of stress corrosion cracking occurring due to use for a long period increases. Therefore, the residual tensile stress of the groove welding portion 122 which is an object to be repaired and the inner surfaces of the tube supports 101c and 101d which are the peripheries thereof is improved to residual compressive stress by a water jet peening device which is a device for repairing the reactor, and thus, the stress corrosion cracking is prevented. The water jet peening device sprays high-pressure water including cavitation air bubbles on a surface of a metal member in water, and improves the residual tensile stress of the surface of the metal member to the residual compressive stress.

In addition, when the residual tensile stress of the groove welding portion 122 and the inner surfaces of the tube support 101c and 101d which are the peripheries thereof is improved to the residual compressive stress by the water jet peening device, the water jet peening device is inserted into the inner portions of the tube support 101c and 101d to perform work.

Figure 2:
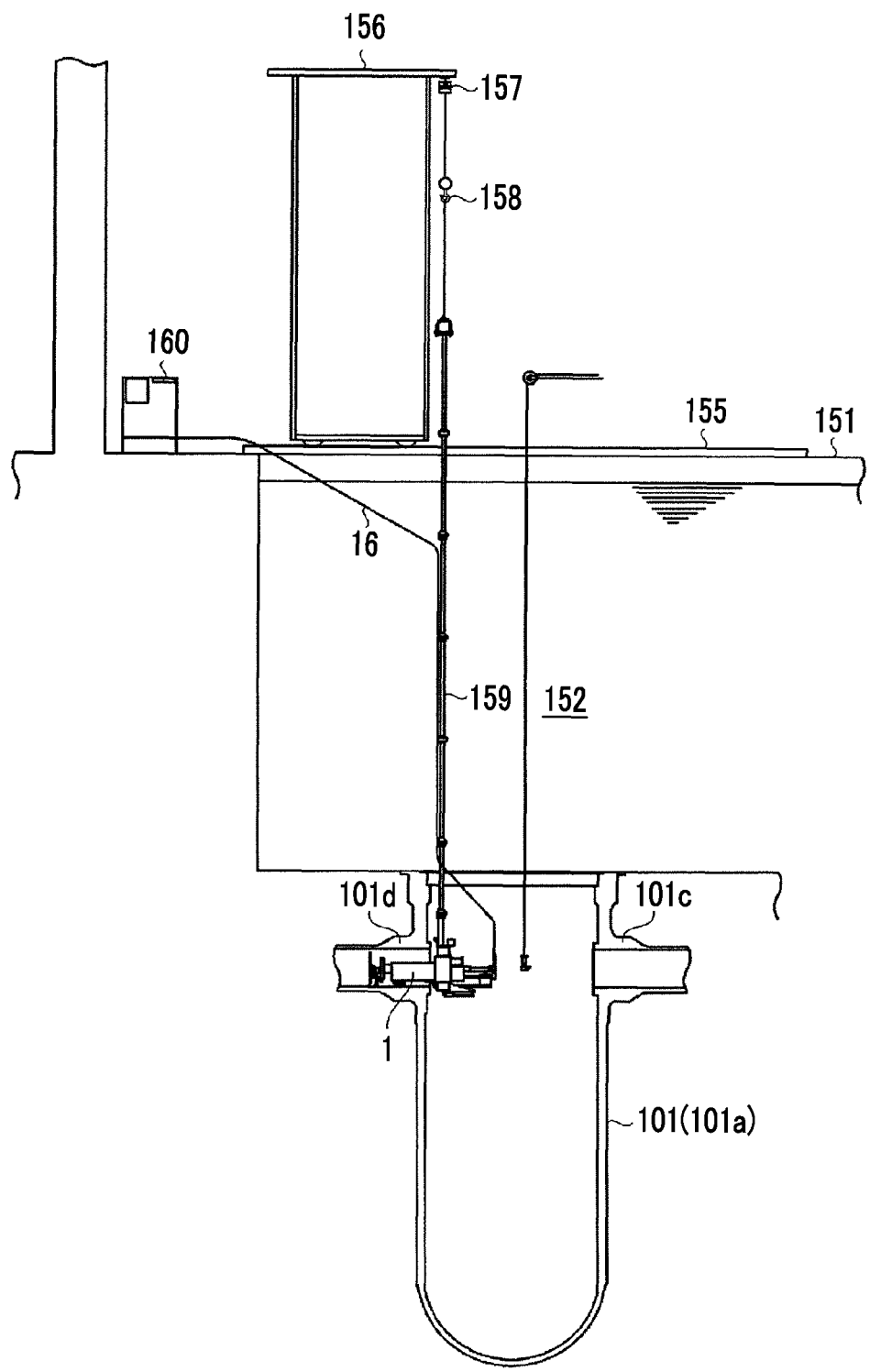
FIG. 2 is a schematic view showing an installation state of water jet peening device.
Figure 3:
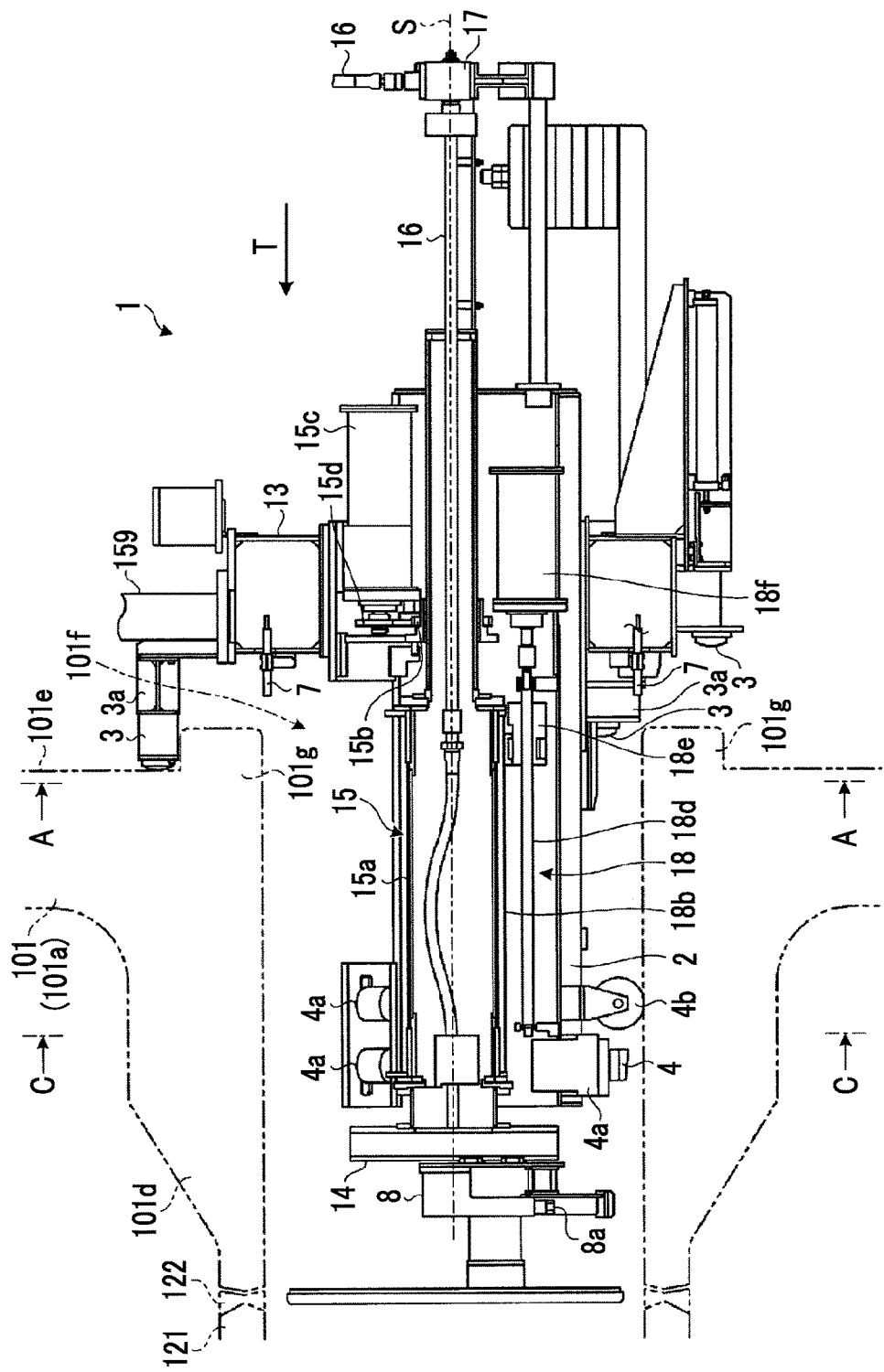
FIG. 3 is a side sectional view showing the water jet peening device.
Figure 4:
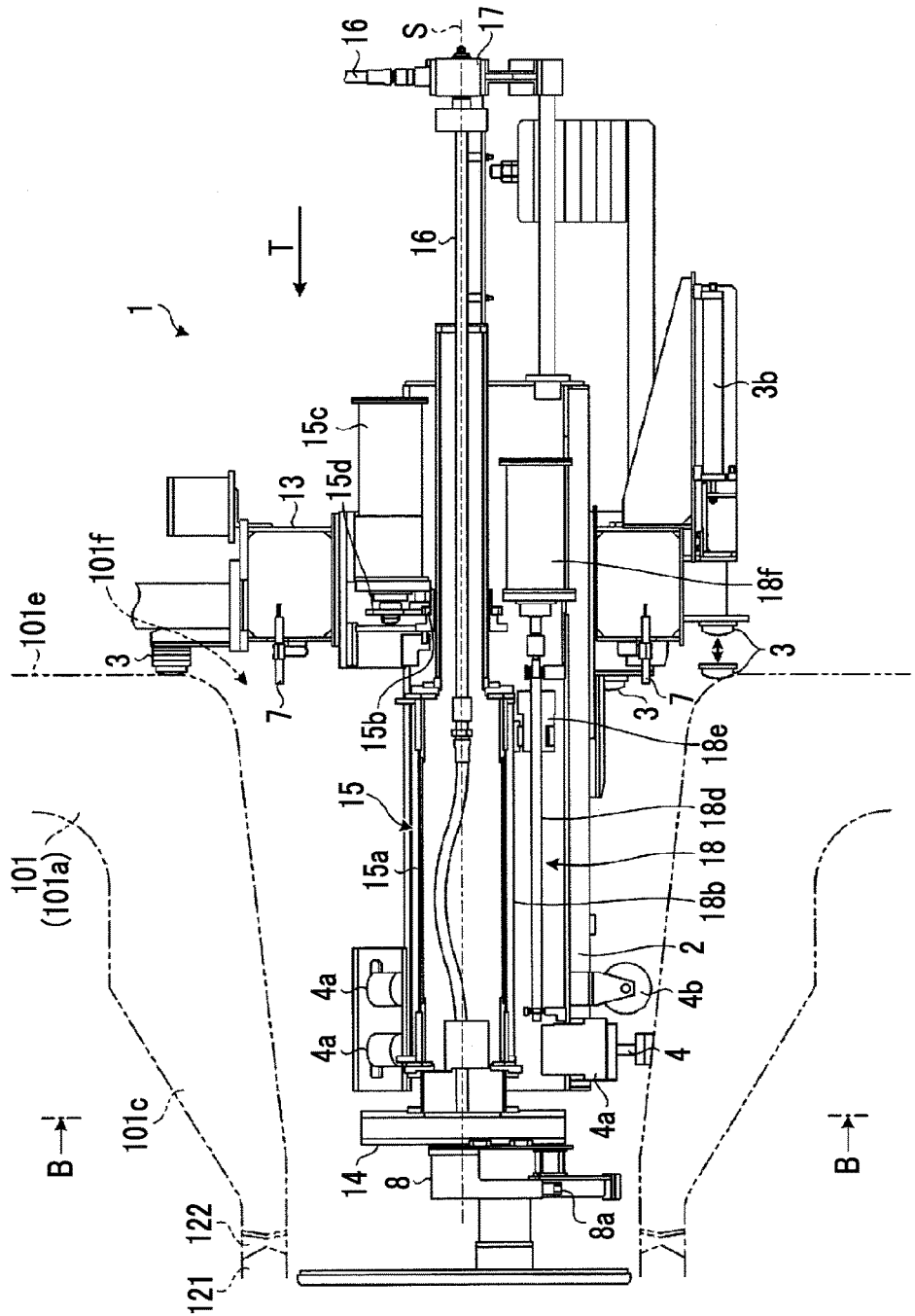
FIG. 4 is a side sectional view showing another use state of the water jet peening device.
Figure 5:
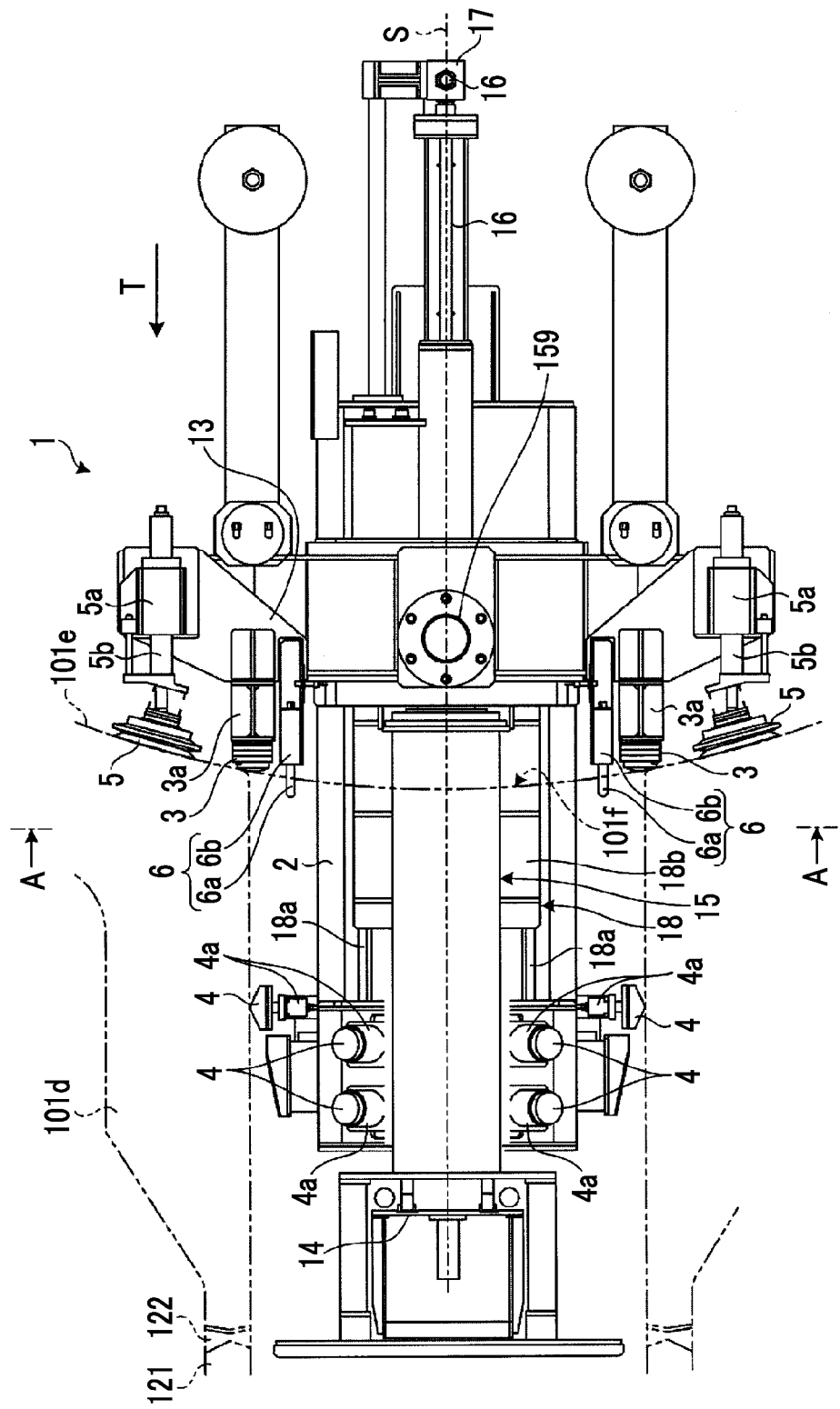
FIG. 5 is a plan view showing the water jet peening device.
Figure 6:
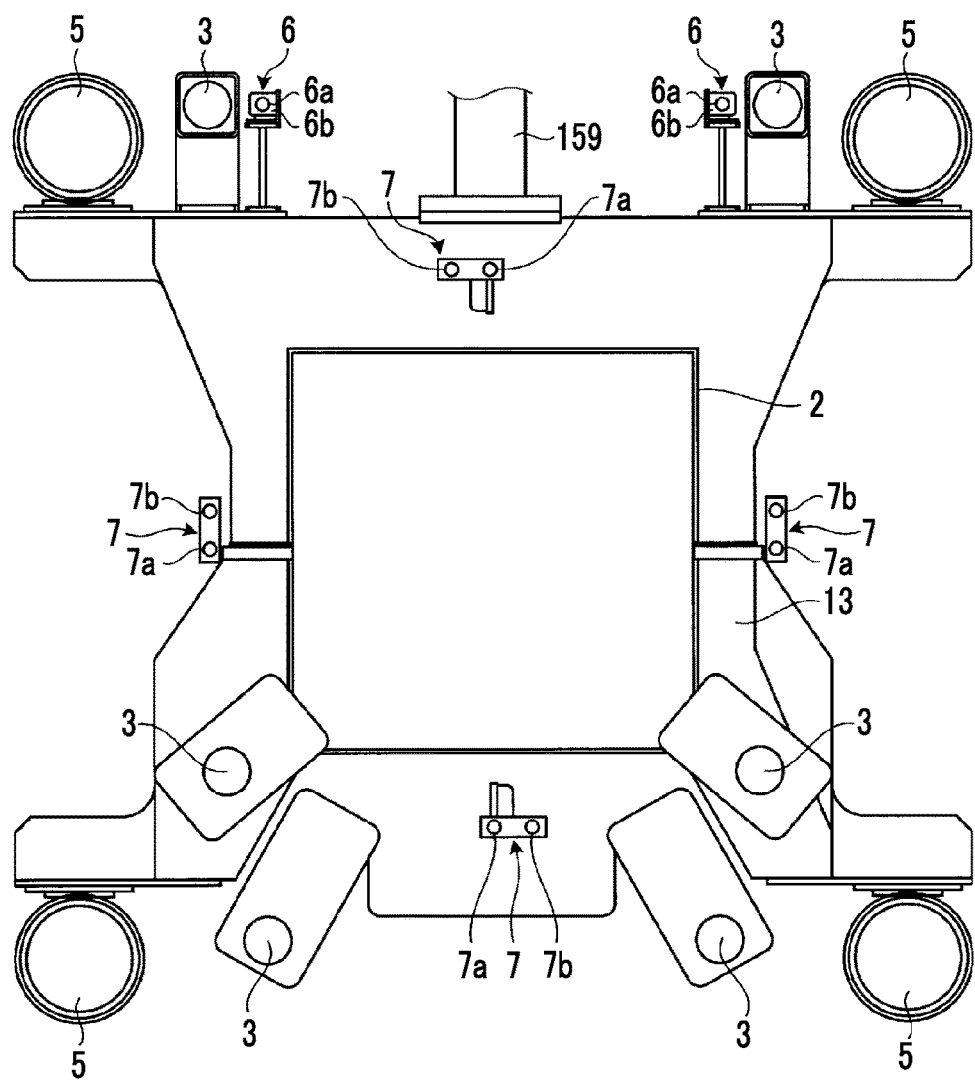
FIG. 6 is a sectional view taken along line A-A in FIGS. 3 and 5.
Figure 7:
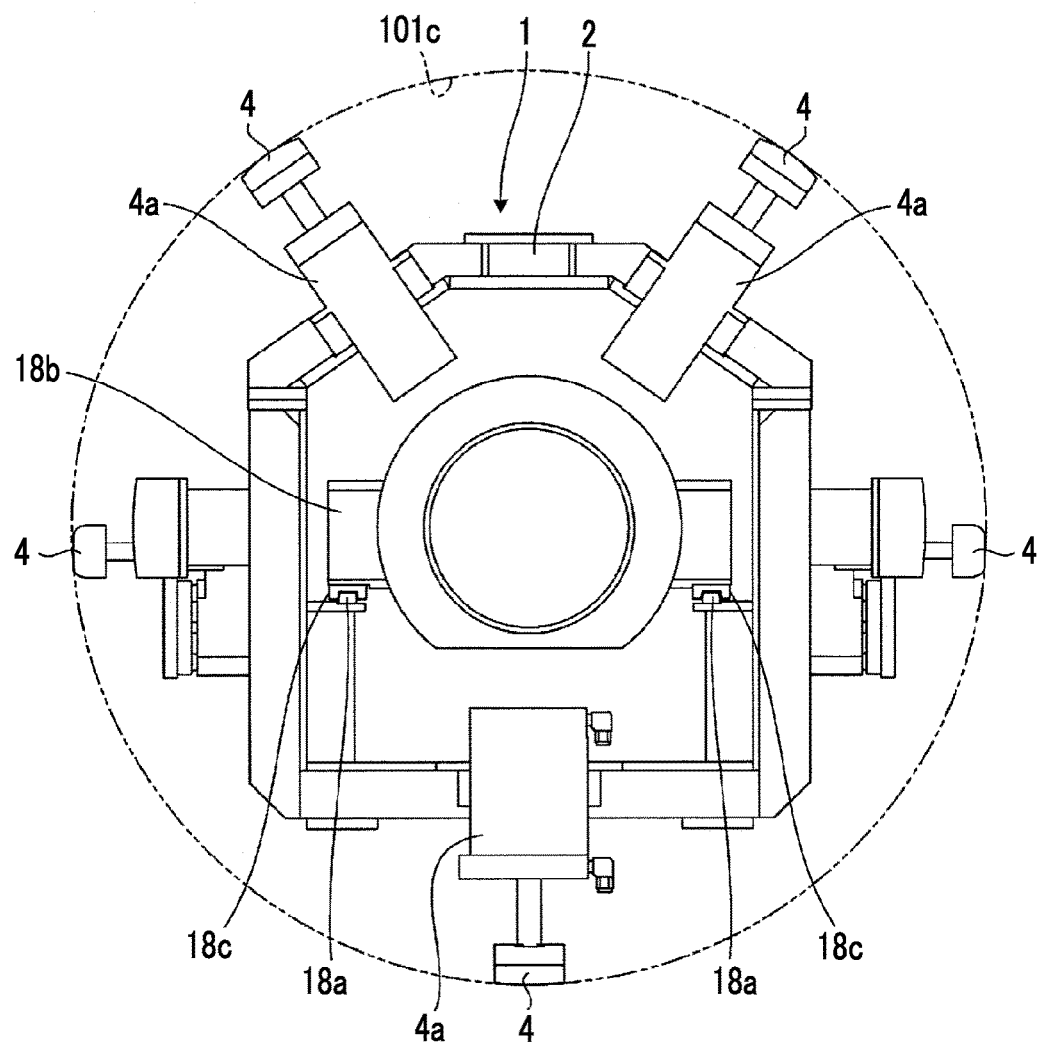
FIG. 7 is a sectional view taken along line B-B in FIG. 4.
Figure 8:
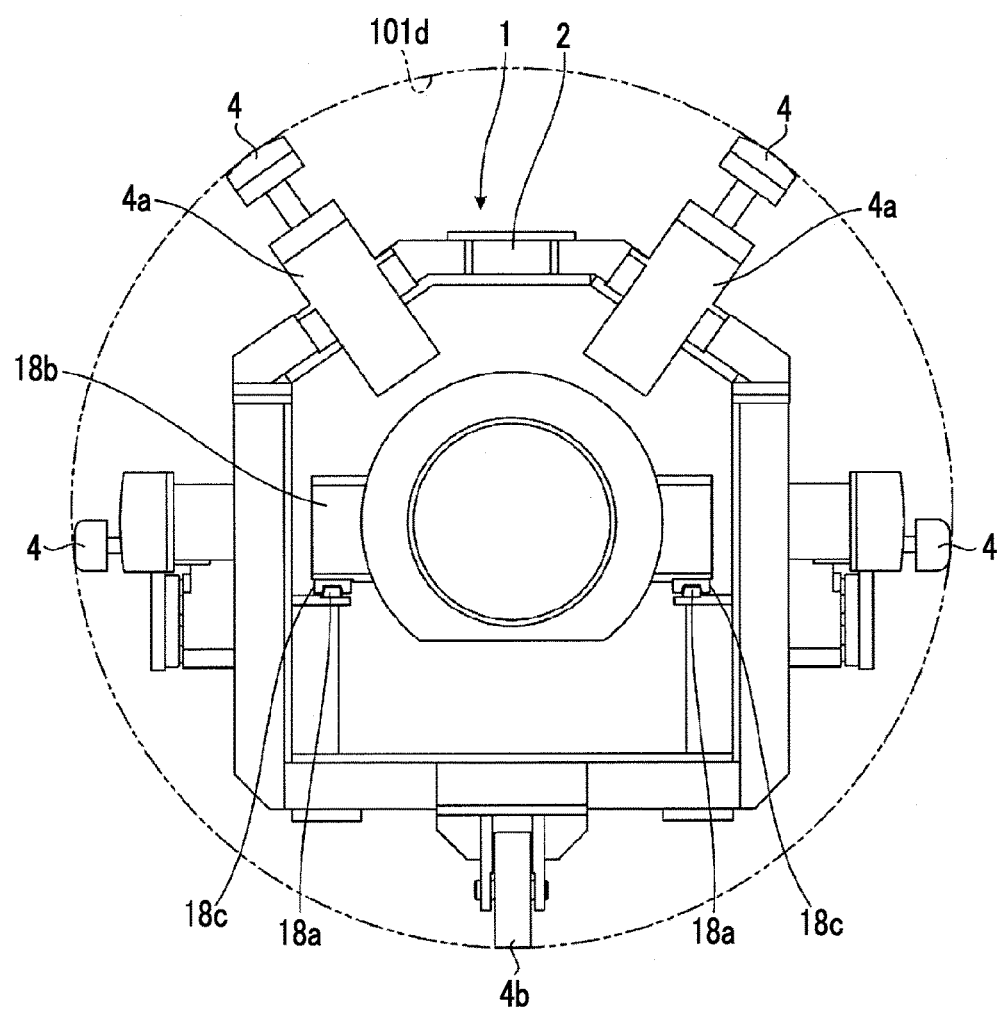
FIG. 8 is a sectional view taken along line C-C in FIG. 3.
Figure 9:
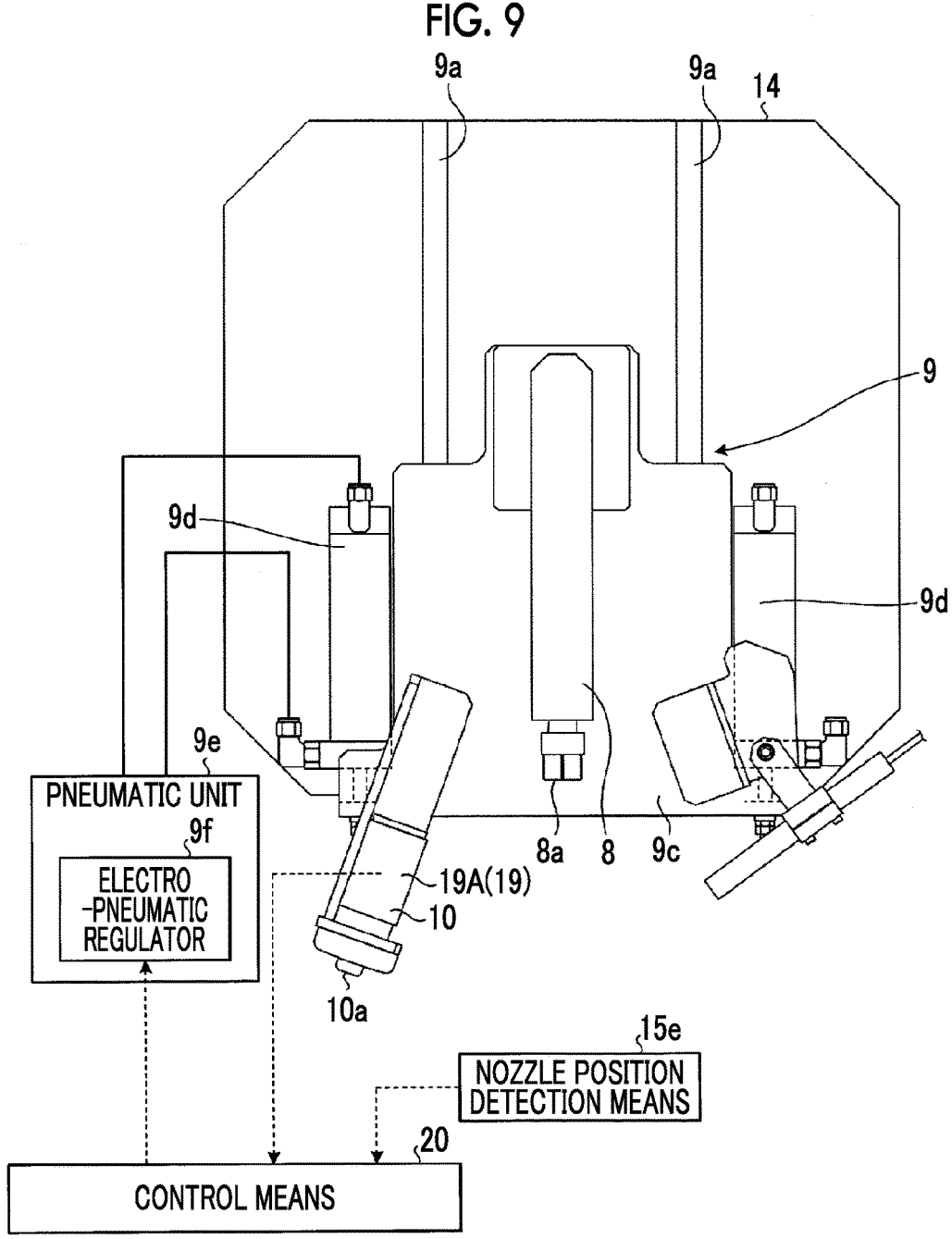
FIG. 9 is a front view showing a pressing movement mechanism of the water jet peening device.

FIG. 2 is a schematic view showing an installation state of the water jet peening device. FIG. 3 is a side sectional view showing the water jet peening device. FIG. 4 is a side sectional view showing another use state of the water jet peening device. FIG. 5 is a plan view showing the water jet peening device. FIG. 6 is a sectional view taken along line A-A in FIGS. 3 and 5. FIG. 7 is a sectional view taken along line B-B in FIG. 4. FIG. 8 is a sectional view taken along line C-C in FIG. 3. FIG. 9 is a front view showing a pressing movement mechanism of the water jet peening device. FIG.

Figure 11:
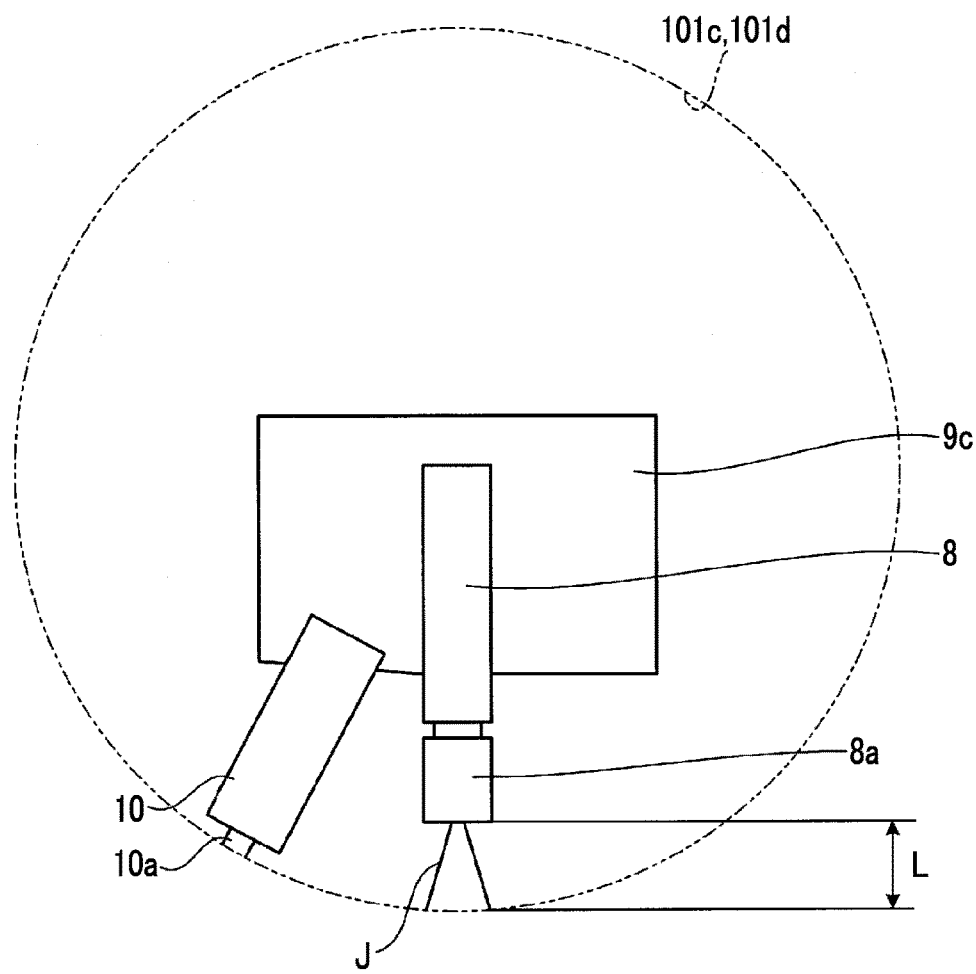
FIG. 11 is a schematic view showing an operation of the water jet peening device.
Figure 12:
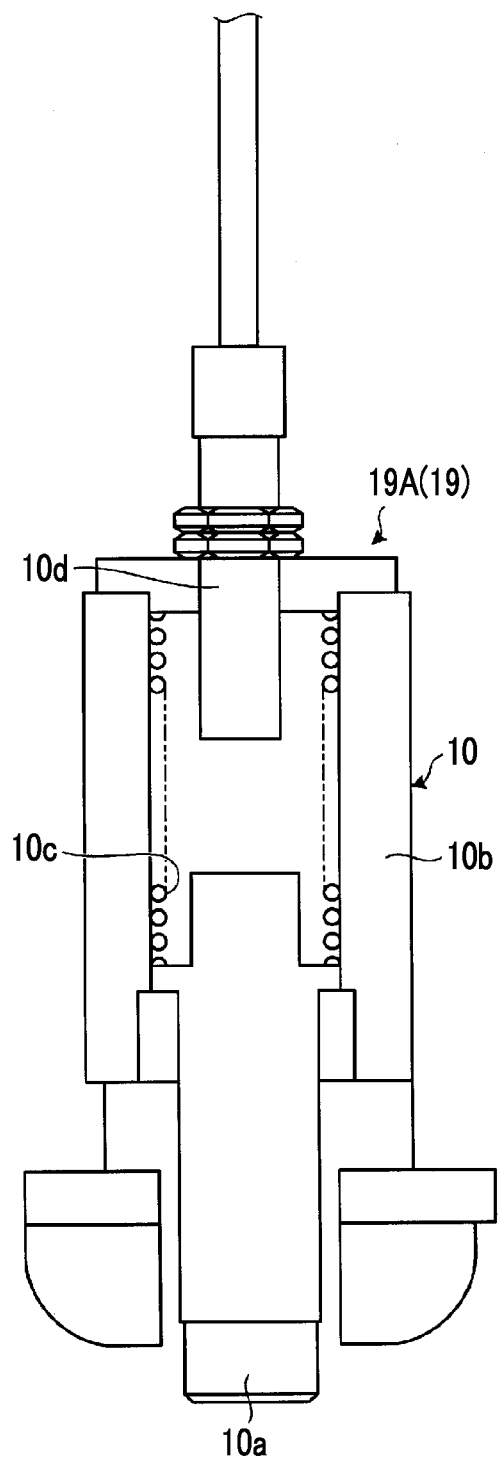
FIG. 12 is a sectional view showing contact detection means of the water jet peening device.

10 is a side view showing the pressing movement mechanism of the water jet peening device. FIG. 11 is a schematic view showing an operation of the water jet peening device. FIG. 12 is a sectional view showing contact detection means of the water jet peening device.

As shown in FIG. 2, a water jet peening device 1 is inserted into and fixed to the inner portions of the inlet side tube support 101c or the outlet side tube support 101d of the reactor vessel 101 (reactor vessel body 101a).

Moreover, in the nuclear power generation plant, a working floor 151 is provided in a reactor building (not shown), a cavity 152 is provided below the working floor 151, and cooling water is stored in the cavity 152. The reactor vessel 101 is disposed inside the cavity 152 and is supported in a suspended manner. In the reactor building, a pair of parallel guide rails 155 is provided on both sides of the cavity 152, and a mobile crane 156 is movably supported by the rails 155. The mobile crane 156 is movable in one direction (right-left direction in FIG. 2) in a horizontal direction, and an electric hoist 157 which is movable in the other direction (a direction orthogonal to the paper surface in FIG. 2) intersecting (orthogonal to) the one direction in the horizontal direction is provided in the mobile crane 156. In addition, the electric hoist 157 includes a hook 158 which can be lifted and lowered in the vertical direction. An installation pole 159 is suspended via the hook 158.

The installation pole 159 is a long member and has a predetermined length, and the water jet peening device 1 can be connected to the lower end portion of the installation pole 159. The installation pole 159 is configured of a plurality of division poles, and the flange portions of the upper ends and the lower ends of the division poles come into close contact with each other, and it is possible to fasten the upper ends and the lower ends by a plurality of swing bolts.

As shown in FIGS. 3 to 5, each of the tube supports 101c and 101d includes an opening portion 101f on a wall surface 101e inside the reactor vessel 101 and is provided to extend in a horizontal direction (or including a horizontal component). The water jet peening device 1 is inserted into and fixed to the inner portions of the tube supports 101c and 101d from the opening portions 101f. In addition, in the present embodiment, the installation pole 159 is used as an installation tool used to install the water jet peening device 1. However, the present invention is not limited to this, and for example, a wire, a cable, a lope, or the like may be used.

The water jet peening device 1 includes a frame 2 which is connected to the installation pole 159. The frame 2 has an outer shape which can be inserted into the inner portions of the tube supports 101c and 101d and is formed in a tube shape extending along an insertion direction T. An external abutment member 3, an internal abutment member 4, suction means 5, abutment detection means 6, photographing means 7, a spray nozzle 8, a pressing movement mechanism 9, and a guide portion 10 are provided on the frame 2.

As shown in FIGS. 3 to 5, when the frame 2 is inserted into predetermined positions inside the tube supports 101c and 101d, the external abutment member 3 abuts the wall surface 101e. As shown in FIGS. 3 to 6, the external abutment member 3 is attached to a support member 13, which extends to the outside of the frame 2 and is fixed to the frame 2, so as to protrude toward the tip on the insertion tip side (insertion direction T side) of the frame 2. In the present embodiment, the external abutment members 3 are disposed at a total of six locations, that is, two locations one each on the right and left above the support member 13, and four locations two each on the right and left below the support member 13.

As shown in FIGS. 3 and 5, the two upper external abutment members 3 and the two lower external abutment members 3 which are slightly close to the upper side are configured so as to change the positions of the tips toward the insertion tip side of the frame 2 according to presence or absence of spacers 3a. In addition, as shown in FIGS. 3 to 5, the two lower external abutment member 3 which are slightly close to the lower side are configured so as to be movable to change the positions of tips toward the insertion tip side of the frame 2 by an actuator (pneumatic cylinder) 3b. The shape of the opening portion 101f of the inlet side tube support 101c is different from that of the opening portion 101f of the outlet side tube support 101d. That is, a protrusion 101g is formed on the outlet side tube support 101d, and the inlet side tube support 101c and the outlet side tube support 101d are distinguished according to the presence or the absence of the protrusion 101g.

In this way, since the external abutment members 3 are provided, it is possible to position the state where the frame 2 is inserted into predetermined positions inside the tube supports 101c and 101d.

As shown in FIGS. 3 to 5, 7, and 8, the plurality of internal abutment members 4 are provided on the periphery centered around the frame 2 (center axis S) on a portion in which the frame 2 is inserted into the inner portions of the tube supports 101c and 101d, and are provided to protrude toward the tips on the outside in a radial direction. In the present embodiment, the internal abutment members 4 are disposed at a total of seven locations, that is, as shown in FIG. 5, four locations two each at the front and the rear in the insertion direction T of the frame 2 one each on the right and the left above the center of the frame 2, two locations on both sides in the vicinity of the center position of the frame 2, and as shown in FIGS. 4 and 7, one location below the center position of the frame 2. The internal abutment members 4 are configured so as to be movable forward and rearward in the radial direction centered around the frame 2 by an actuator (pneumatic cylinder) 4a. The internal abutment members 4 which are moved forward and rearward by the actuator 4a abut the inner surfaces of the tube supports 101c and 101d.

As shown in FIGS. 4 and 7, the one internal abutment member 4 below the center position of the frame 2 is positioned below the two internal abutment members 4 positioned at the front side in the insertion direction T of the frame 2 on the right and the left of the upper side, and is used to align the center position of the frame 2 with the center position of the inlet side tube support 101c when the internal abutment members 4 are inserted into the inlet side tube support 101c at five locations including the above-described three locations and two internal abutment members 4 on both sides in the vicinity of the center position of the frame 2. Meanwhile, as shown in FIGS. 3 and 8, a tire 4b rolling in the insertion direction T is provided as the internal abutment member 4, which does not move forward and rearward, on the rear side of one internal abutment member 4 below the center position of the frame 2. The tire 4b is positioned below two internal abutment members 4 on the rear side in the insertion direction T of the frame 2 on the right and left of the upper side, and is used to align the center position of the frame 2 with the center position of the outlet side tube support 101d when the two internal abutment members 4 are inserted into the outlet side tube support 101d at five locations on both sides of the height in the vicinity of the center position of the frame 2. The hole shape of the inlet side tube support 101c is different from that of the outlet side tube support 101d. That is, an inclination is formed on the inner surface so that the diameter of the inlet side tube support 101c decreases toward the inner portion, and the inclination is not formed on the outlet side tube support 101d. Accordingly, the internal abutment members 4 are used to align the center position of the frame 2 with the center positions of the tube supports 101c and 101d according to the presence and absence of the inclination.

In this way, since the internal abutment members 4 are provided, it is possible to align the center position of the frame 2 with the center positions of the tube supports 101c and 101d.

As shown in FIG. 5, the suction means 5 is provided so as to be sucked to the wall surface 101e when the frame 2 is inserted into predetermined positions inside the tube supports 101c and 101d. As shown in FIGS. 5 and 6, the suction means 5 is attached to the support member 13 so that a suction surface of the suction means is directed to the insertion tip side (insertion direction T side) of the frame 2. In the present embodiment, the suction means 5 is disposed at a total of four locations, that is, two location one each on the right and left above the support member 13 and two locations one each on the right and left below the support member 13. In addition, as shown in FIG. 5, the suction means 5 is provided so as to be movable along the insertion direction T by an actuator (pneumatic cylinder) 5a. Moreover, as shown in FIG. 5, the suction means 5 is provided so as to be swung in the right-left direction with respect to a rod 5b of the actuator 5a to correspond to the inclination of the wall surface 101e.

In this way, since the suction means 5 is provided, it is possible to maintain the state where the frame 2 inserted into the inner portions of the tube supports 101c and 101d is positioned by the external abutment members 3, and the state where the center position of the frame 2 and the center positions of the tube supports 101c and 101d are aligned with each other by the internal abutment members 4.

As shown in FIG. 5, the abutment detection means 6 detects that the external abutment members 3 abut the wall surface 101e. As shown in FIGS. 5 and 6, the abutment detection means 6 is disposed on the side portions of the upper external abutment member 3 and is attached to the support member 13 so that the tip of a contactor 6a is directed to the insertion tip side (insertion direction T side) of the frame 2. The contactor 6a is provided so as to be movable along the insertion direction T with respect to a casing 6b, and is biased by a spring (not shown) so as to protrude toward the insertion direction T side at all times. A proximity sensor (not shown) is provided inside the casing 6b, and detects that the contactor 6a moves in a direction opposite to the insertion direction T. In addition, when the external abutment members 3 abut the wall surface 101e, and simultaneously, the contactor 6a abuts the wall surface 101e and moves in the direction opposite to the insertion direction T, the movement of the contactor 6a is detected by the proximity sensor, and the abutment detection means 6 detects that the external abutment members 3 abut the wall surface 101e.

In this way, since the abutment detection means 6 is provided, it is possible to recognize the state where the external abutment members 3 abut the wall surface 101e, that is, an intent in which the frame 2 inserted inside the tube supports 101c and 101d is positioned by the external abutment members 3.

As shown in FIGS. 3, 4, and 6, the photographing means 7 is disposed at a total of four locations one each with respect to the support members 13, that is, the upper, lower, right, left locations of the frame 2. The photographing means 7 includes a camera 7a and an illumination 7b, and the camera and illumination are provided so as to be directed toward the insertion tip side (insertion direction T) of the frame 2. The photographing means 7 photographs the insertion tip side of the frame 2 inserted into the tube supports 101c and 101d, from the insertion rear end side.

In this way, since the photographing means 7 is provided, it is possible to monitor the state of the frame 2 inserted into the tube supports 101c and 101d.

Accordingly, in the case where the frame 2 is inserted into the tube supports 101c and 101d, when detection signals of the abutment detection means 6 are input while monitoring an image, which is photographed by the photographing means 7, by a monitor (not shown) disposed on the working floor 151, it is recognized that the external abutment members 3 abut the wall surface 101e. Thereafter, the internal abutment members 4 abut the inner surfaces of the tube supports 101c and 101d, and the suction means 5 is sucked to the wall surfaces 101e of the tube supports 101c and 101d.

The spray nozzle 8 sprays water jet to inner surfaces of the tube supports 101c and 101d. As shown in FIGS. 3, 4, and 9, the spray nozzle 8 is disposed at a nozzle support portion 14 provided on the insertion tip side of the frame 2 so that a spray port 8a spraying the water jet is directed toward the inner surfaces of the tube supports 101c and 101d.

As shown in FIGS. 3 and 4, the nozzle support portion 14 is rotatably supported around the center axis S (center axes of the tube supports 101c and 101d) of the frame 2 with respect to the frame 2. Specifically, the nozzle support portion 14 is supported by the nozzle rotating mechanism 15. The nozzle rotating mechanism 15 includes a rotating shaft portion 15a. The nozzle support portion 14 is attached to the rotating shaft portion 15a, and the rotating shaft portion 15a is rotatably supported about the center axis S with respect to the frame 2. The rotating shaft portion 15a is formed in a cylindrical shape extending along the center axis S, and a driven gear 15b is attached to the outer circumference of the rotating shaft portion 15a. The driven gear 15b engages with a driving gear 15d which is provided on an output axis of a rotating motor 15c fixed to the frame 2. In the nozzle rotating mechanism 15, the rotation of the driving gear 15d is transmitted to the driven gear 15b by the driving of the rotating motor 15c, and thus, the rotating shaft portion 15a is rotated. Accordingly, the nozzle support portion 14 supported by the rotating shaft portion 15a is rotated accompanying the spray nozzle 8. As a result, the spray nozzle 8 rotates and moves along a predetermined movement trajectory around the center axis S.

As described above, the spray nozzle 8 is disposed on the nozzle support portion 14 so that the spray port 8a spraying the water jet is directed toward the inner surfaces of the tube supports 101c and 101d. Accordingly, in the spray nozzle 8 which is rotated and moved by the nozzle rotating mechanism 15, the spray port 8a rotates and moves along the predetermined movement trajectory in the circumferential direction of the tube supports 101c and 101d while being directed toward the inner surfaces of the tube supports 101c and 101d. That is, in the direction of the spray port 8a of the spray nozzle 8, a perpendicular downward rotation angle is defined as 0°, and the spray port 8a is rotated 360° along the circumferential directions of the tube supports 101c and 101d via a perpendicular upward rotation angle of 180°. The movement position of the spray port 8a in the movement trajectory is detected by nozzle position detection means 15e (refer to FIG. 9) provided in the nozzle rotating mechanism 15. In the present embodiment, the rotating motor 15c is configured of a servo motor, and thus, the movement position of the spray port 8a in the movement trajectory is detected by the nozzle position detection means 15e.

As shown in FIGS. 3 and 4, in the above-described nozzle rotating mechanism 15, a high-pressure water supply pipe 16 for supplying high-pressure water to the spray nozzle 8 is disposed inside the rotating shaft portion 15a. The high-pressure water supply pipe 16 is provided to extend along the center axis S from the insertion rear end side of the frame 2 in the rotating shaft portion 15a, and a swivel bearing 17 is disposed on the extended end portion. The high-pressure water supply pipe 16 extends upward from the swivel bearing 17, and as shown in FIG. 2, is connected to a high-pressure water pump 160 which is installed on the working floor 151 and feeds high-pressure water. That is, the high-pressure water fed from the high-pressure water pump 160 is supplied to the spray nozzle 8 via the high-pressure water supply pipe 16, and is sprayed to the inner surfaces of the tube supports 101c and 101d from the spray port 8a as water jet. In addition, the spray nozzle 8 is rotated around the center axis S by the nozzle rotating mechanism 15, and thus, the water jet is sprayed to the inner surfaces of the tube supports 101c and 101d along the circumstantial directions of the tube supports 101c and 101d. In addition, when the rotating shaft portion 15a is rotated by the nozzle rotating mechanism 15, the high-pressure water supply pipe 16 inside the rotating shaft portion 15a is also rotated. However, since the swivel bearing 17 is provided in the intermediate of the high-pressure water supply pipe 16, it is possible to prevent the high-pressure water supply pipe 16 from being twisted.

Moreover, as shown in FIGS. 3 and 4, the nozzle support portion 14 is supported so as to be movable forward and rearward along the center axis S (center axes of the tube supports 101c and 101d) of the frame 2 with respect to the frame 2. Specifically, the nozzle support portion 14 is supported by a nozzle forward/rearward movement mechanism 18 which is provided inside the frame 2. As shown in FIGS. 3 to 5, 7, and 8, the nozzle forward/rearward movement mechanism 18 includes slide rails 18a, a slide frame 18b, sliders 18c, a ball screw 18d, a nut portion 18e, and a forward/rearward movement motor 18f. A pair of slide rails 18a extends so as to be parallel with the center axis S of the frame 2 and is provided right and left. The slide frame 18b is supported so as to be moveable in the extension directions of the slide rails 18a with respect to the slide rails 18a. The sliders 18c are attached via the slide rails 18a, and fixed to the slide frame 18b. The ball screw 18d is provided to extend along the center axis S of the frame 2 so as to be parallel with the slide rails 18a, and is rotatably supported about an axis parallel with the center axis S with respect to the frame 2. The nut portion 18e is screwed to the ball screw 18d. The forward/rearward movement motor 18f is connected to the ball screw 18d to rotate the ball screw 18d. In addition, in the nozzle forward/rearward movement mechanism 18, since the ball screw 18d is rotated by the driving of the forward/rearward movement motor 18f, the sliders 18c move accompanying the slide frame 18b in the extension direction (the direction parallel with the center axis S) of the ball screw 18d along with the nut portion 18e. The rotating shaft portion 15a of the above-described nozzle rotating mechanism 15 which supports the nozzle support portion 14 is attached to the slide frame 18b. That is, the rotating shaft portion 15a moves in the direction parallel with the center axis S along with the slide frame 18b accompanying the nozzle support portion 14 to which the spray nozzle 8 is supported. As a result, the spray nozzle 8 moves forward and rearward along the center axis S.

As described above, the rotating shaft portion 15a is rotated around the center axis S, and thus, the rotating shaft portion 15a is attached in the state where the rotating shaft portion 15a can rotate with respect to the slide frame 18b. In addition, the rotating shaft portion 15a is provided so that the driven gear 15b is movable along the center axis S. Moreover, the movement of the driven gear 15b along the center axis S is regulated in the state where the meshing between driven gear 15b and the driving gear 15d is maintained. Accordingly, the transmission of the driving for rotating the rotating shaft portion 15a is constantly maintained when the rotating shaft portion 15a moves forward and rearward by the nozzle forward/rearward movement mechanism 18. That is, the rotating shaft portion 15a is provided so that the rotating shaft portion 15a itself is rotated and the forward and rearward movements thereof along the center axis S are performed.

Figure 10:
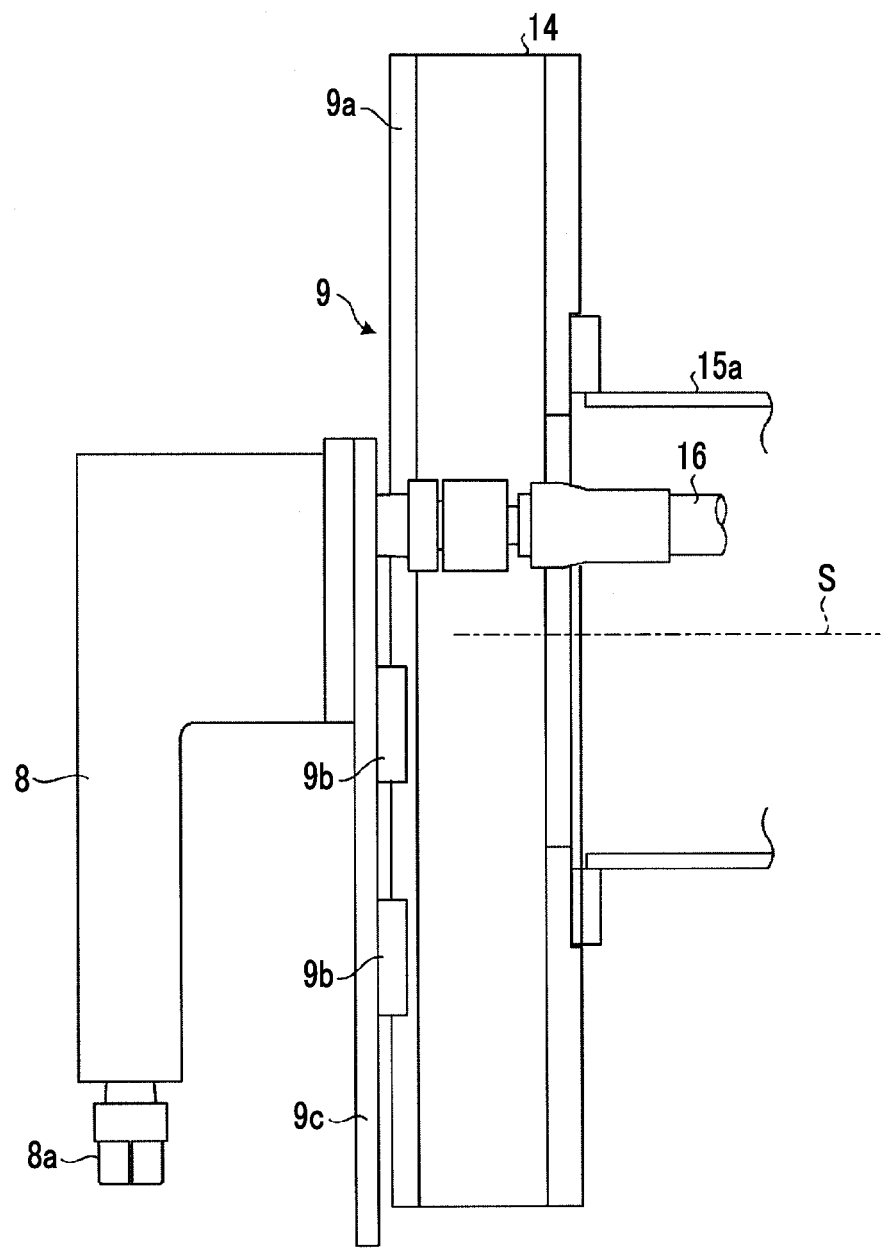
FIG. 10 is a side view showing the pressing movement mechanism of the water jet peening device.

The pressing movement mechanism 9 presses and moves the spray nozzle 8 along the direction in which the water jet is sprayed from the spray port 8a. As shown in FIGS. 9 and 10, the pressing movement mechanism 9 is provided on the nozzle support portion 14, and includes slide rails 9a, sliders 9b, a slide frame 9c, and actuators 9d. The pair of slide rails 9a is provided to extend in the direction orthogonal to the center axis S. The sliders 9b are supported so as to be movable in the extension directions of the slide rails 9a. The slide frame 9c is supported by the sliders 9b, and is provided so as to be movable in the extension directions of the slide rails 9a. The spray nozzle 8 is fixed to the slide frame 9c so that the spray port 8a is directed in the extension directions of the slide rails 9a. Each of the actuators 9d is provided on the nozzle support portion 14 so as to be disposed on the side portion of each slide rail 9a, and is connected to the slide frame 9c. The actuator 9d moves the slide frame 9c in the extension direction of the slide rail 9a, and in the present embodiment, is configured of a pneumatic cylinder. The actuator 9d is not limited to the pneumatic cylinder, and may be any cylinder as long as it can move the slide frame 9c in the extension directions of the slide rails 9a. In addition, in the pressing movement mechanism 9, the slide frame 9c moves in the direction orthogonal to the center axis S accompanying the spray nozzle 8 by the driving of the actuator 9d. That is, in the state where the spray port 8a of the spray nozzle 8 opposes the inner surfaces of the tube supports 101c and 101d, the spray port 8a is pressed and moved so that the spray port 8a approaches and is separated from the inner surfaces of the tube supports 101c and 101d. As a result, a spray distance of the water jet which is the distance from the spray port 8a to the inner surfaces of the tube supports 101c and 101d is adjusted. As the spray distance of the water jet, 130 mm±10 mm is defined as a predetermined distance.

As shown in FIGS. 9 and 11, the guide portion 10 is fixed to the slide frame 9c of the pressing movement mechanism 9 along with the spray nozzle 8. Accordingly, the guide portion 10 performs the rotational movement, forward and rearward movements, and the press movement along with the spray nozzle 8. The guide portion 10 is provided so as to be parallel with the spray nozzle 8, and a tip portion 10a is disposed at a position aligned with the predetermined distance over which the water jet J is sprayed from the spray port 8a. That is, the guide portion 10 is pressed and moved along with the spray nozzle 8 by the pressing movement mechanism 9, and as shown in FIG. 11, the tip portion 10a comes into contact with the inner surfaces of the tube supports 101*c* and 101*d*, and thus, a predetermined distance L over which the water jet J is sprayed from the spray port 8*a* is maintained.

Accordingly, in the state where the frame 2 is inserted into the inner portions of the tube supports 101*c* and 101*d* by the external abutment members 3, the internal abutment members 4, and the suction means 5, the spray nozzle 8 is moved forward and rearward to the position, at which the spray port 8*a* is directed toward predetermined inner surfaces of the tube supports 101*c* and 101*d* subjected to the water jet peening, by the nozzle forward/rearward movement mechanism 18. Thereafter, the spray nozzle 8 is pressed and moved until the tip portion 10*a* of the guide portion 10 comes into contact with the inner surfaces of the tube supports 101*c* and 101*d* by the pressing movement mechanism 9. Thereafter, the spray nozzle 8 is rotated and moved by the nozzle rotating mechanism 15 while the water jet is sprayed from the spray port 8*a* of the spray nozzle 8. Accordingly, the water jet peening is constructed on the predetermined inner surfaces of the tube supports 101*c* and 101*d*.

In addition, in the water jet peening device 1 of the present embodiment, in order to detect contact of the tip portion 10*a* in the guide portion 10, contact detection means 19 is provided. As shown in FIG. 9, the contact detection means 19 is configured of tip portion movement detection means 19A.

As shown in FIG. 12, the tip portion movement detection means 19A is provided so that the tip portion 10*a* moves in a direction in which the tip portion 10*a* is pressed and moved to the main body portion 10*b*. The tip portion 10*a* is biased so as to constantly protrude by a spring 10*c* which is disposed inside the main body portion 10*b*. Moreover, a proximity sensor 10*d* facing the tip portion 10*a* is provided inside the main body portion 10*b*. The proximity sensor 10*d* detects that the tip portion 10*a* approaches the inner surfaces of the tube supports 101*c* and 101*d*, that is, the tip portion 10*a* comes into contact with the inner surfaces of the tube supports 101*c* and 101*d* and the tip portion 10*a* is pushed into the inner portion of the main body portion 10*b*.

As shown in FIG. 9, detection signals, in which the contact of the tip portion 10*a* in the guide portion 10 is detected by the contact detection means 19 (tip portion movement detection means 19A), are input to control means 20. The control means 20 determines that the tip portion 10*a* of the guide portion 10 comes into contact with the inner surfaces of the tube supports 101*c* and 101*d* by the input of the detection signals generated by the contact of the tip portion 10*a* in the guide portion 10.

In this way, since the contact detection means 19 (tip portion movement detection means 19A) is provided, it is possible to confirm that the tip portion 10*a* of the guide portion 10 comes into contact with the inner surfaces of the tube supports 101*c* and 101*d*. Accordingly, it is possible to securely maintain the predetermined distance L over which the water jet is sprayed from the spray port 8*a*, and it is possible to improve construction accuracy of the water jet peening.

In the present embodiment, the surfaces to be constructed on which the water jet peening is performed are the inner surfaces of the tube supports 101*c* and 101*d* which extend to include horizontal components. Accordingly, the direction of the spray port 8*a* is directed upward and downward so that the spray port 8*a* is directed toward the inner surfaces of the tube supports 101*c* and 101*d* according to the movement trajectory of the spray nozzle 8 which is rotated and moved around the center axis S by the nozzle rotating mechanism 15. In addition, in upward water jet peening in which the spray port 8*a* is directed upward, since the spray nozzle 8 is pushed downward by a reaction force and gravity of the water jet, the pressing force of the guide portion 10 decreases. Accordingly, the tip portion 10*a* of the guide portion 10 is separated from the inner surfaces of the tube supports 101*c* and 101*d*, the spray distance L of the water jet from the spray port 8*a* to the inner surfaces of the tube supports 101*c* and 101*d* cannot be maintained, and effects of the water jet peening with respect to the inner surfaces of the tube supports 101*c* and 101*d* decrease. Meanwhile, in downward water jet peening in which the spray port 8*a* is directed downward, since the spray nozzle 8 is pushed downward by the gravity, the pressing force of the guide portion 10 increases. Accordingly, a contact pressure when the tip portion 10*a* of the guide portion 10 comes into contact with the inner surfaces of the tube supports 101*c* and 101*d* increases, a load is applied to the nozzle rotating mechanism 15, and thus, there is a concern that the rotational movement of the spray nozzle 8 may not be smoothly performed.

Accordingly, in the water jet peening device 1 of the present embodiment, the control means 20 inputs the movement position of the spray port 8*a* which is detected by the nozzle position detection means 15*e*, and controls the pressing force of the guide portion 10 generated by the pressing movement mechanism 9, on the basis of the movement position of the spray port 8*a*.

As described above, the control means 20 inputs the detection signals of the movement position (rotation angle) of the spray port 8*a* in the movement trajectory of the spray nozzle 8, from the nozzle position detection means 15*e*. In addition, as shown in FIG. 9, the actuator 9*d* is configured of a pneumatic cylinder and includes a pneumatic unit 9*e* which operates the pneumatic cylinder. In the pneumatic unit 9*e*, air pressure of the pneumatic cylinder is adjusted by an electro-pneumatic regulator 9*f*, and air pressure command is obtained from the signals by the control means 20. The control means 20 sets air pressure command in advance according to the movement position (rotation angle) of the spray port 8*a*, and outputs the signals of the air pressure command to the electro-pneumatic regulator 9*f*.

The control means 20 stores air pressure in advance, which is calculated considering the reaction force and the gravity of the water jet in the movement position (rotation angle) of the spray port 8*a* in the movement trajectory of the spray nozzle 8. In addition, the control means 20 controls the electro-pneumatic regulator 9*f* according to the movement position of the spray port 8*a* input from the nozzle position detection means 15*e*, and outputs voltage corresponding to the required air pressure to the actuator 9*d*. That is, in the movement position of the spray port 8*a*, when the direction of the spray port 8*a* is the movement position including the upward component, as shown in FIG. 9, the control means 20 controls the electro-pneumatic regulator 9*f* of the pneumatic unit 9*e* in the pressing movement mechanism 9 to increase the air pressure, and increase the pressing force by which the guide portion 10 is pressed upward (to the inner surfaces of the tube supports 101*c* and 101*d*) against the reaction force and gravity of the water jet. Specifically, in a trajectory in which the direction of the spray port 8*a* is directed upward from the horizontal direction and returned to the horizontal direction, the air pressure gradually increases from the horizontal state, the highest air pressures is set at the vertical position, and the air pressure gradually decreases while being returned to the horizontal state. Accordingly, since it is possible to prevent the tip portion 10*a* of the guide portion 10 from being separated from the inner surfaces of the tube supports 101*c* and 101*d*, the spray distance L of the water jet from the spray port 8a to the inner surfaces of the tube supports 101c and 101d is maintained, and it is possible to maintain effects of the water jet peening with respect to the inner surfaces of the tube supports 101c and 101d. Meanwhile, when the direction of the spray port 8a is the movement position including the downward component, as shown in FIG. 9, the control means 20 controls the electro-pneumatic regulator 9f of the pneumatic unit 9e in the pressing movement mechanism 9 to decrease the air pressure, and decreases the pressing force by which the guide portion 10 is pressed downward (to the inner surfaces of the tube supports 101c and 101d) against the spray nozzle 8 being pushed downward by the gravity. Specifically, in a trajectory in which the direction of the spray port 8a is directed downward from the horizontal direction and returned to the horizontal direction, the air pressure gradually decreases from the horizontal state, the lowest air pressures is set at the vertical position, and the air pressure gradually increases while being returned to the horizontal state. Accordingly, since it is possible to prevent the contact pressure from increasing when the tip portion 10a of the guide portion 10 comes into contact with the inner surfaces of the tube supports 101c and 101d, the load applied to the nozzle rotating mechanism 15 decreases, and thus, it is possible to smoothly perform the rotational movement of the spray nozzle 8. That is, regardless of the movement position of the spray port 8a, it is possible to keep the contact pressure of the tip portion 10a in the guide portion 10 so as to be constant.

REFERENCE SIGNS LIST

1: WATER JET PEENING DEVICE
2: FRAME
3: EXTERNAL ABUTMENT MEMBER
4: INTERNAL ABUTMENT MEMBER
5: SUCTION MEANS
6: ABUTMENT DETECTION MEANS
7: PHOTOGRAPHING MEANS
8: SPRAY NOZZLE
8a: SPRAY PORT
9: PRESSING MOVEMENT MECHANISM
10: GUIDE PORTION
10a: tip portion
15: NOZZLE ROTATING MECHANISM
18: NOZZLE FORWARD/REARWARD MOVEMENT MECHANISM
19: CONTACT DETECTION MEANS
19A: TIP PORTION MOVEMENT DETECTION MEANS
19B: PRESSING OPERATION FORCE DETECTION MEANS
20: CONTROL MEANS
100: REACTOR CONTAINER
101c, 101d: TUBE SUPPORT
101e: WALL SURFACE
101f: OPENING PORTION
101g: PROTRUSION

The invention claimed is:

1. A water jet peening device in which a spray nozzle for spraying water jet is provided so as to be movable along a predetermined movement trajectory so that a spray port of the spray nozzle is directed upward and downward, comprising:
a guide portion which includes a tip portion disposed at a position aligned with a predetermined distance over which the water jet is sprayed from the spray port, and is provided so as to be movable with the spray nozzle along the movement trajectory;
a pressing movement mechanism which presses and moves the spray nozzle and the guide portion along a direction in which the water jet is sprayed from the spray port;
a nozzle position detector which is configured to detect a movement position of the spray port in the movement trajectory; and
a controller which is configured to control a pressing force of the pressing movement mechanism on the guide portion, on the basis of the movement position of the spray port detected by the nozzle position detector,
wherein the pressing movement mechanism includes a pneumatic cylinder and a pneumatic unit which controls an air pressure of the pneumatic cylinder, and the air pressure is controlled by a signal from the controller based on the movement position of the spray port detected by the nozzle position detector,
wherein the water jet peening device sprays the water jet to an inner surface of a tube support which includes an opening portion on a wall surface and extends to include a horizontal component, and
wherein the water jet peening device includes:
a frame which supports the spray nozzle and the guide portion and is provided so as to be inserted into the inner portion of the tube support;
an external abutment member which is provided on the frame and abuts the wall surface when the frame is inserted into a predetermined position inside the tube support;
internal abutment members which are provided at a plurality of locations around the frame in a portion of the frame inserted into the inner portion of the tube support and is provided so as to be movable forward and rearward in a radial direction centered around the frame; and
suction means which is provided on the frame and can be sucked to the wall surface when the frame is inserted into the predetermined position inside the tube support.

2. The water jet peening device according to claim 1, further comprising:
a contact detector which is configured to detect contact of the tip portion of the guide portion.

3. The water jet peening device according to claim 1, further comprising:
an abutment detector which is configured to detect abutment of the external abutment member on the wall surface.

4. The water jet peening device according to claim 1, further comprising:
photographing means for photographing an insertion tip side of the frame, which is inserted into the tube support, from an insertion rear end side,
wherein the photographing means is provided on the frame.

* * * * *